(12) United States Patent
Bliss et al.

(10) Patent No.: US 11,544,041 B2
(45) Date of Patent: Jan. 3, 2023

(54) NEXT GENERATION DIGITIZED MODELING SYSTEM AND METHODS

(71) Applicant: Aetna Inc., Hartford, CT (US)

(72) Inventors: Michelle Bliss, Venetia, PA (US); Claus T. Jensen, Pawling, NY (US)

(73) Assignee: Aetna Inc., Hartford, CT (US)

( * ) Notice: Subject to any disclaimer, the term of this patent is extended or adjusted under 35 U.S.C. 154(b) by 81 days.

(21) Appl. No.: 16/692,515

(22) Filed: Nov. 22, 2019

(65) Prior Publication Data

US 2021/0157551 A1    May 27, 2021

(51) Int. Cl.
  *G06F 9/50* (2006.01)
  *G06F 8/10* (2018.01)
  (Continued)

(52) U.S. Cl.
  CPC ............... *G06F 8/20* (2013.01); *G06F 8/10* (2013.01); *G06F 40/205* (2020.01); *G06F 40/30* (2020.01);
  (Continued)

(58) Field of Classification Search
  CPC . G06F 8/20; G06F 8/10; G06F 40/205; G06F 40/30; G06F 40/131; G06F 40/274; G06F 40/35; G06F 40/157; G06F 11/0709; G06F 11/3644; G06F 8/70; G06F 8/77; G06F 8/38; G06F 8/35; G06F 8/60; G06F 8/61; G06F 16/93; G06F 16/9535; G06F 16/9532; G06F 16/9538; G06F 16/9024; G06F 16/24522; G06F 16/248;
  (Continued)

(56) References Cited

U.S. PATENT DOCUMENTS

| | | | |
|---|---|---|---|
| 8,683,425 B2 * | 3/2014 | Aryanto .................... | G06F 8/20 717/103 |
| 10,558,554 B2 * | 2/2020 | Bhandarkar ........... | G06N 20/00 |

(Continued)

OTHER PUBLICATIONS

Jason Liang et al., Evolutionary Neural AutoML for Deep Learning, 2019, [Retrieved on Oct. 21, 2022], Retrieved from the internet: <URL: https://dl.acm.org/doi/pdf/10.1145/3321707.3321721> 9 Pages (401-409) (Year: 2019).*

*Primary Examiner* — Anibal Rivera
(74) *Attorney, Agent, or Firm* — Leydig, Voit & Mayer, Ltd.

(57) ABSTRACT

A system and method are disclosed for creating solution design blueprints. A solution design blueprint is a machine-readable data structure that includes a conceptual design model for an application framework. A user interface is configured to receive a plain language textual request from a user that describes a desired application or solution to a problem. Artificial Intelligence is leveraged to fit the textual request to semantic data models and map elements of the textual request to components of a design library. The resulting solution design blueprint can be presented to a user, and the user interface can be used to provide feedback related to the solution design blueprint that can be utilized to update machine learning algorithms and/or neural networks. In some embodiments, the solution design blueprint can be converted to an application framework that is provided to the use in an integrated development environment of the user interface.

18 Claims, 13 Drawing Sheets

(51) Int. Cl.
  G06F 8/20      (2018.01)
  G06N 3/04      (2006.01)
  G06N 20/00     (2019.01)
  G06F 40/30     (2020.01)
  G06F 40/205    (2020.01)
  G06F 40/274        (2020.01)
  G06F 40/157        (2020.01)
  G06N 3/08          (2006.01)
  G06F 40/131        (2020.01)
  G06F 8/70          (2018.01)
  G06F 16/9535       (2019.01)
  G06F 16/9538       (2019.01)
  G06F 8/77          (2018.01)
  G06F 8/60          (2018.01)
  G06F 11/36         (2006.01)
  G06F 16/93         (2019.01)
  G06F 16/9532       (2019.01)
  G06F 8/35          (2018.01)
  G06F 16/901        (2019.01)
  G06N 5/02          (2006.01)
  G06F 8/38          (2018.01)

(52) U.S. Cl.
  CPC .............. *G06N 3/04* (2013.01); *G06N 20/00* (2019.01); *G06F 8/35* (2013.01); *G06F 8/38* (2013.01); *G06F 8/60* (2013.01); *G06F 8/70* (2013.01); *G06F 8/77* (2013.01); *G06F 11/3664* (2013.01); *G06F 11/3668* (2013.01); *G06F 11/3684* (2013.01); *G06F 16/9024* (2019.01); *G06F 16/93* (2019.01); *G06F 16/9532* (2019.01); *G06F 16/9535* (2019.01); *G06F 16/9538* (2019.01); *G06F 40/131* (2020.01); *G06F 40/157* (2020.01); *G06F 40/274* (2020.01); *G06N 3/08* (2013.01); *G06N 5/02* (2013.01)

(58) Field of Classification Search
  CPC ............. G06F 11/3688; G06F 11/3664; G06F 11/3684; G06N 20/00; G06N 3/04; G06N 3/08; G06N 5/02; G06N 5/022; G06N 5/042
  See application file for complete search history.

(56) References Cited

U.S. PATENT DOCUMENTS

| | | | |
|---|---|---|---|
| 2004/0088688 A1* | 5/2004 | Hejlsberg | G06F 8/51 717/106 |
| 2013/0091484 A1* | 4/2013 | Aryanto | G06F 8/20 717/101 |
| 2014/0040741 A1* | 2/2014 | van Os | G06F 3/0484 715/719 |
| 2016/0140125 A1* | 5/2016 | Goyal | G06N 20/00 707/751 |
| 2018/0307464 A1* | 10/2018 | Bijani | G06F 8/36 |
| 2019/0266070 A1* | 8/2019 | Bhandarkar | G06F 11/3644 |
| 2020/0193221 A1* | 6/2020 | Aftab | G06F 8/34 |
| 2021/0034339 A1* | 2/2021 | Romero | G06N 5/04 |
| 2021/0042110 A1* | 2/2021 | Basyrov | G06F 40/284 |

* cited by examiner

NEXT GENERATION DIGITIZED MODELING SYSTEM AND METHODS

BACKGROUND

In developing new applications for business, there is an increasing complexity in projects that seek to integrate multiple existing applications and/or data sources to generate results. When architects sit down to design a new application, they may take into account overall company strategies, architectural principles, vendor and hosted infrastructure, among other factors. As industries grow and the list of resources available to leverage increase, the job of defining a list of design elements that a project may require will continue to increase in complexity. As such, an organization may be required to streamline a design blueprint quickly and efficiently.

Systems and techniques available for determining a solution design blueprint are highly dependent on a knowledge base and skillset possessed by a particular individual (e.g., the architect). Such existing techniques lack the application of a holistic approach that is integrated into existing architectural resources. Furthermore, the existing techniques fail to apply leading edge artificial intelligence solutions to assist the architects in creating sufficient solution design blueprints that meet the goals for specific projects. There is a need to increase the efficiency and quality of the design process and to support the process across a breadth of different design goals.

SUMMARY

A system for generating solution design blueprints is disclosed herein. In some embodiments, the system includes a user interface configured to receive a textual request from a user and an ingestion engine in communication with the user interface. The ingestion engine is configured to process the textual request by one or more machine learning algorithms to generate a solution design blueprint. In an embodiment, at least one machine learning algorithm is configured to parse the textual request based on semantic data models. In an embodiment, at least one additional machine learning algorithm is configured to map parsed components of the textual request to components in a design library. In an embodiment, the design library includes at least one of relational tables and unstructured data.

In some embodiments, the one or more machine learning algorithms includes at least one of a recurrent neural network (RNN), a convolutional neural network (CNN), or a self-organizing feature map (SOFM).

In some embodiments, the system further includes an intelligent design generator. The intelligent design generated is configured to reject or accept the solution design blueprint and, if the solution design blueprint is rejected, then select a second solution design blueprint generated by the ingestion engine in response to the textual request, or, if the solution design blueprint is accepted, then present the solution design blueprint to the user in the user interface. In an embodiment, the user interface is configured to receive feedback from the user for the solution design blueprint. Furthermore, at least one machine learning algorithm can be trained based on the feedback.

In some embodiments, the intelligent design generator is further configured to consume the solution design blueprint to generate an application framework. The application framework can include source code in a particular programming language that is readable by a compiler.

In some embodiments, the system can also include at least one user queue that monitors a work flow of a user in generating an application from the application framework. At least one machine learning algorithm can be adjusted based on an analysis of the work flow.

In some embodiments, the user interface is configured to utilize predictive analytics to suggest completions for the textual request while the user is typing.

A method for generating solution design blueprints is also disclosed and can be performed by any system configured to perform the steps of the method. The steps include receiving a textual request from a user interface, parsing the textual request based on semantic data models to generate a parsed request, generating a solution design blueprint based on a design library, and presenting the solution design blueprint to a user in the user interface. The parsing and generating can be performed, at least in part, through execution of at least one machine learning algorithm.

In some embodiments, the method further includes the steps of receiving a plurality of solution design blueprints for the textual request, ranking each of the plurality of solution design blueprints, selecting a particular solution design blueprint based on the ranking, and presenting the particular solution design blueprint to the user in the user interface.

In some embodiments, the method further includes the steps of receiving feedback from the user for the solution design blueprint and training at least one machine learning algorithm based on the feedback.

In some embodiments, the method further includes the step of consuming the solution design blueprint to generate an application framework.

In some embodiments, the method further includes the steps of collecting, in a user queue, a work flow of the user in developing an application using the application framework and adjusting at least one machine learning algorithm based on an analysis of the work flow.

A program product embodied on a non-transitory computer-readable medium is also disclosed. The non-transitory computer-readable medium stores instructions that when executed by a processor, cause the processor to generate solution design blueprints by performing the method steps described above.

DETAILED DESCRIPTION

Artificial Intelligence and Deep Learning Neural Networks can be utilized to assist in the creation of solution design blueprints, which can take the form of a conceptual design model (e.g., a sketch) for an application framework that defines components and integration points. A textual request created by a user is parsed using machine learning algorithms and/or neural networks to fit the elements of the textual request to one or more semantic data models, which helps to establish a deeper understanding of the components included in the application framework and a series of relationships or interconnection points between components.

The solution design blueprints are generated based, at least in part, on an existing design library such that existing applications or components can be integrated into the conceptual design model for new applications, as appropriate. Feedback related to the generated solution design blueprints can be collected and utilized to update the machine learning algorithms and/or neural networks in order to create better solution design blueprints as more and more textual requests are submitted by developers.

Figure 1:
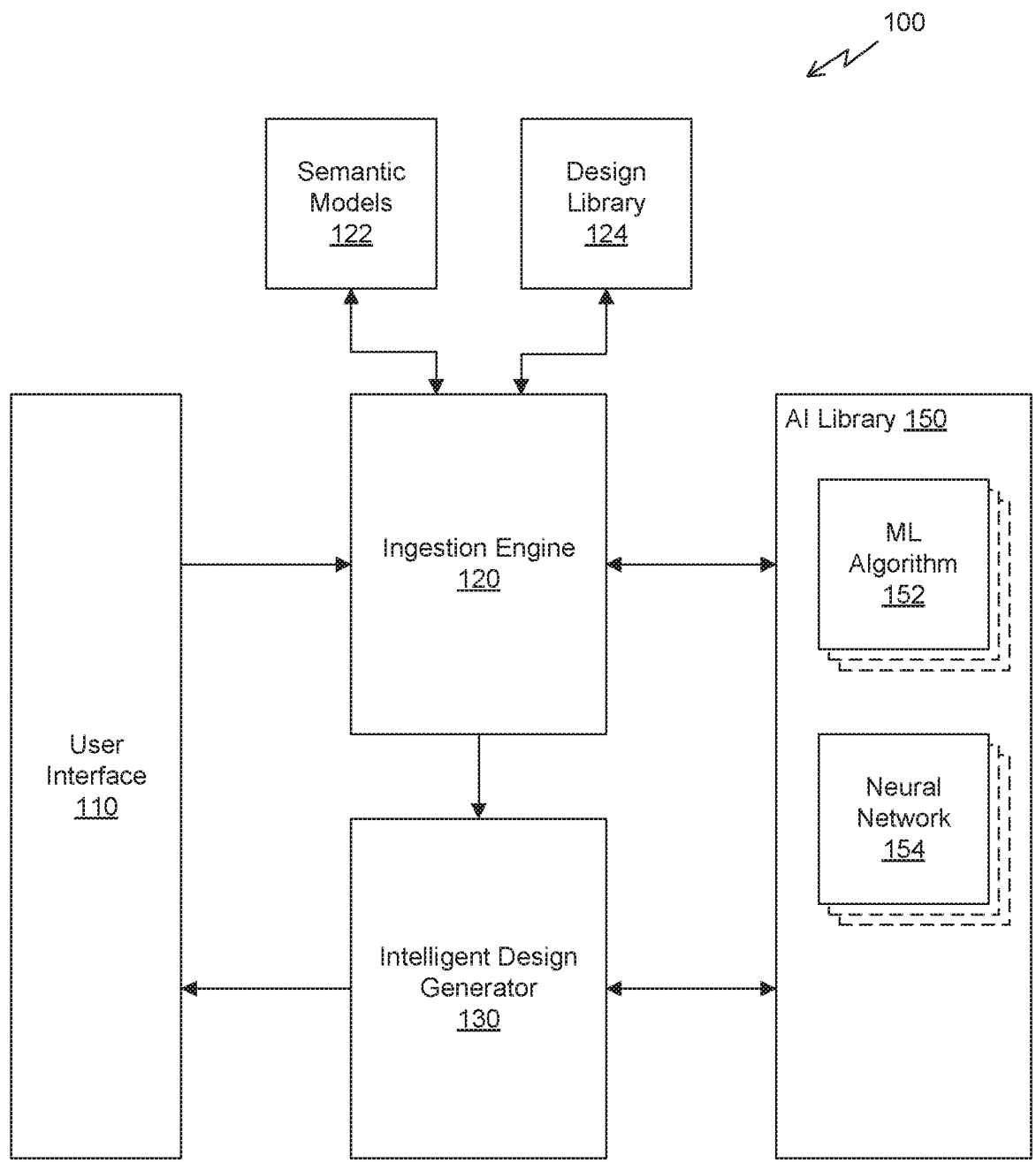
FIG. 1 illustrates a system 100 for creating solution design blueprints, in accordance with some embodiments.

FIG. 1 illustrates a system 100 for creating solution design blueprints, in accordance with some embodiments. As depicted in FIG. 1, the system 100 includes a user interface 110, an ingestion engine 120, an intelligent design generator 130, and an artificial intelligence (AI) library 150. The user interface 110 is configured to receive a textual request from a user. The textual request is forwarded to the ingestion engine 120.

In an embodiment, the textual request is a plain English description of the desired solution design blueprint for a new application. The textual request can include a description of what a software architect desires for a project. For example, the textual request can list the information sources or other resources available within a system, describe one or more tools (e.g., processes, services, applications, etc.) that can be used to process the information or resources, list the desired output of the application, and list any desired structure or connection between existing or new components. The format of the textual request is not rigid and can include any description deemed appropriate by the software architect for the identified problem.

It will be appreciated that while the textual request is described as being provided in the English language, in alternate embodiments, the textual request can be provided in other languages, such as French, German, Chinese, Japanese, or the like. As will be described below, the semantic models 122 can be configured for one or more languages.

In an embodiment, the ingestion engine 120 is in communication with the user interface 110 and is configured to process the textual request by one or more machine learning algorithms to generate a solution design blueprint. The processing can include parsing the textual request based on one or more semantic data models 122. A semantic data model 122 can identify certain types of speech or relationships between words in the language of the textual request. For example, a word like "component" can be modeled as a noun (e.g., a type of speech) that is equivalent to other words in the English language like "element", "module", "unit", "piece", "object", or the like. A semantic data model 122 can also infer structure associated with certain words. For example, the word "interface" may infer a connection between two components. As another example, the term "application programming interface" or "API" may infer a software component that implements functions or procedures for accessing an application corresponding to the API.

In an embodiment, the ingestion engine 120 uses one or more machine learning algorithms 152 and/or neural networks 154 in the AI library 150 to parse the textual request to fit the elements of the textual request into one or more of the semantic data models 122. For example, a machine learning algorithm 152 can be trained to process a sentence in the English language and reduce the sentence to the basic objects in the sentence paired with their corresponding parts of speech. For example, a sentence like "A first module generates an output that includes a key and a value associated with the key" could be processed to return "first module [noun] generates [verb] output including key and value [object]." Of course, it will be appreciated that this format is only one possible format and that the semantic data models 122 can be used to change the desired format of the output of the machine learning algorithm 152.

In an embodiment, the neural networks 154 can include at least one of a recurrent neural network (RNN), a convolutional neural network (CNN), or a self-organizing feature map (SOFM). The RNN refers to a broad class of neural networks that have an output dependent on the current input as well as the previous state of the nodes in the neural network. In other words, RNNs exhibit temporal dynamic behavior where the same input can generate different outputs depending on the current state of each node. RNNs can be used to model memory in artificial intelligence models. The CNN refers to a broad class of neural networks that apply convolutions (e.g., linear operations) to an input. Typical CNNs have a large number of layers (e.g., 50-100) and are most commonly used in image processing problems or classification problems. The SOFM (or self-organizing map—SOM) refers to a broad class of neural networks that maps a high-dimensionality input vector to a low-dimensional output. Typically, SOFM neural networks are used to cluster input data into different classes based on a commonality between a high number of input attributes.

The ML algorithms 152 can utilize one or more of the neural networks 154. For example, a particular ML algorithm 152 can employ a CNN and an RNN to process different portions of the input. It will be appreciated that the types of neural networks that can be implemented in the AI library 150 are not limited to CNNs, RNNs, and SOFM and that other types of neural networks are within the scope of the described embodiments.

In an embodiment, the ingestion engine 120 uses one or more machine learning algorithms 152 and/or neural networks 154 in the AI library 150 to map parsed components of the textual request to components in a design library 124. In an embodiment, the design library 124 includes information related to assets or components accessible through one or more networks. For example, the design library 124 can include information such as a list of applications or services that are deployed via a company Intranet. The design library 124 can also include information about services that can be utilized by an application. The services can be maintained or developed by the organization or available via third-party service providers via a wide area network (WAN) such as the Internet. In an embodiment, the design library 124 can include relational tables, such as databases with structured content, and unstructured data, such as documentation for applications or services, images that depict a basic structure of a software component, or the like.

The ingestion engine 120 generates one or more solution design blueprints, which are passed to the intelligent design generator 130. As used herein, a solution design blueprint refers to a machine-readable representation of a description for a software framework. In other words, a solution design blueprint is an intermediate representation for a software framework that is somewhere between a plain English description of the desired solution for a stated problem and a source code definition of a software framework that can be used to develop source code for a desired application that is designed to address the stated problem. The solution design blueprint is not required to be written in a particular programming language, but should be easily interpretable to be translated from a format of the solution design blueprint into a software framework in a particular programming language.

For example, the solution design blueprint can have a format of a structured document such as an eXtended Markup Language (XML) document or a JavaScript Object Notation (JSON) document, which includes elements that can easily be translated into a software framework including one or more software modules comprising classes, methods, object definitions, a user interface, or the like.

In an embodiment, the intelligent design generator 130 is configured to reject or accept a solution design blueprint. In some embodiments, the intelligent design generator can implement logic for analyzing a solution design blueprint based on a heuristic algorithm. A score for the solution design blueprint can be compared against a threshold value to determine whether the solution design blueprint is accepted or rejected. An example of the heuristic algorithm can include calculation on a score based on a complexity (e.g., number of functions, number of parameters per function, number of independent variables, etc.) of the solution design blueprint.

If the solution design blueprint is rejected, then the intelligent design generator 130 is configured to select a second solution design blueprint generated by the ingestion engine 120 in response to the textual request. In an embodiment, the intelligent design generator 130 is configured to transmit a request to the ingestion engine 120 that causes the ingestion engine 120 to generate a new solution design blueprint. In some embodiments, the new solution design blueprint is generated using a different ML algorithms 152 and/or different neural network 154. In other embodiments, the new solution design blueprint is generated by making modifications to the textual request, such as by replacing certain words with likely synonyms based on the semantic data models 122.

However, if the solution design blueprint is accepted, then the intelligent design generator 130 is configured to present the solution design blueprint to the user in the user interface 110. In an embodiment, presenting the solution design blueprint includes displaying a representation of the solution design blueprint on a display device within the user interface 110. In some embodiments, the user interface 110 is configured to receive feedback from the user for the solution design blueprint. For example, a prompt can request the user's feedback as to whether the solution design blueprint is accepted or rejected by the user. Since the user's feedback may be subjective, in some embodiments, the feedback can be used to train at least one machine learning algorithm 152 or neural network 154. For example, when a user rejects a provided solution design blueprint, the rejection can be used to adjust parameters of a machine learning algorithm 152 and/or a neural network 154 in order to change the result of the next solution design blueprint using the machine learning algorithm 152 and/or the neural network 154.

In some embodiments, the user interface 110 can be configured to allow a user to generate a software framework based on the solution design blueprint. The user interface 110 can also include editor capabilities that enable a user to modify the software framework and/or develop additional code to create an application based on the software framework. The tasks performed by the user within the user interface 110 can be analyzed to provide the feedback on which the machine learning algorithm 152 and/or the neural network 154 is trained. In this manner, the feedback used to train the AI components in the AI library 150 is not subjective, but objective based on how extensively the software framework was modified to meet the design goal to develop the application.

In other embodiments, the intelligent design generator 130 is configured to create the software framework based on the solution design blueprint. Once a particular solution design blueprint is accepted, the software framework is generated and transmitted to the user interface 110 to be presented to the user. Feedback based on the software framework can then be collected by the user interface 110 and utilized to train the machine learning algorithm 152 and/or the neural network 154.

Figure 2A:
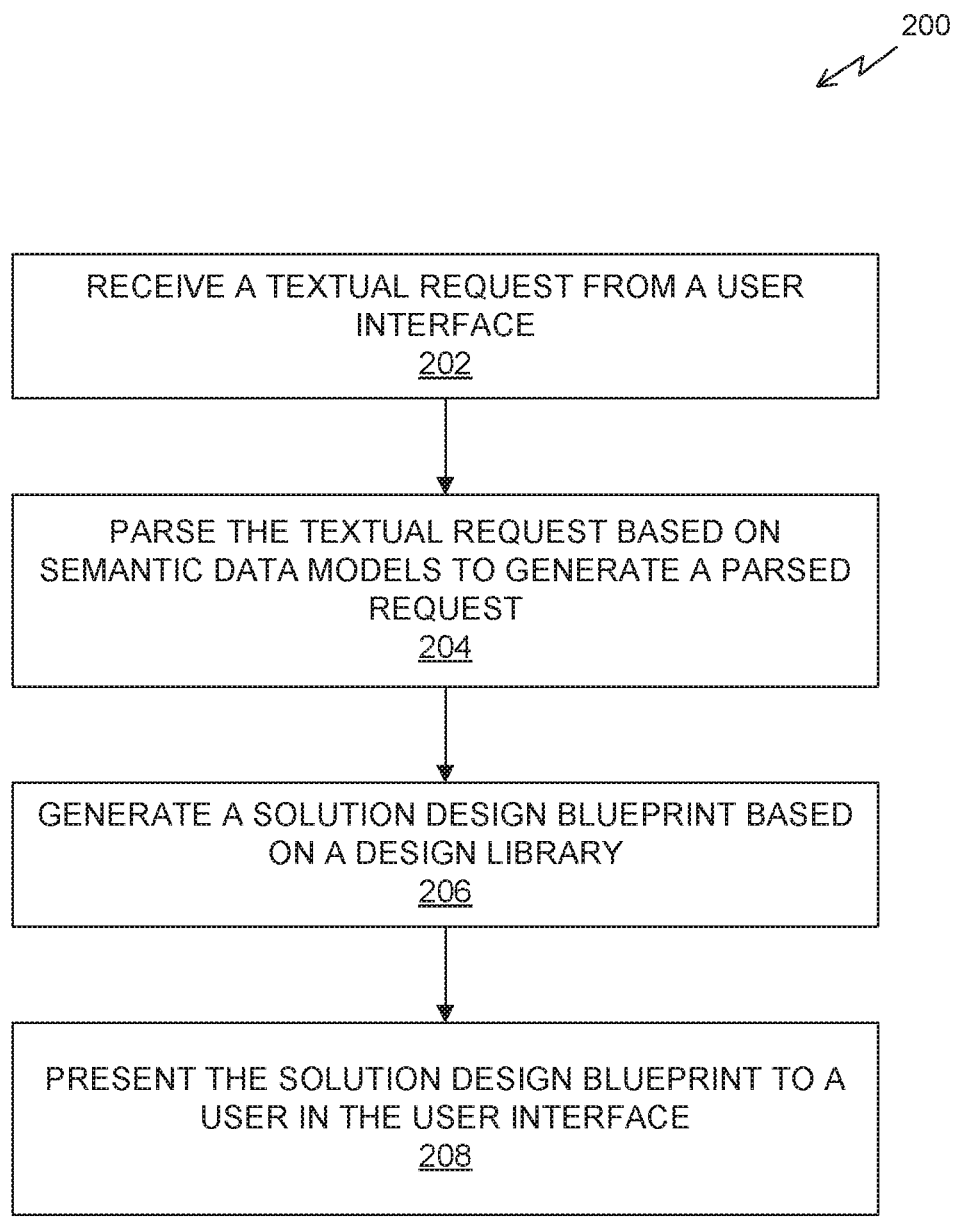
FIG. 2A is a flow diagram of a method 200 for generating a solution design blueprint in response to a textual request, in accordance with some embodiments.

FIG. 2A is a flow diagram of a method 200 for generating a solution design blueprint in response to a textual request, in accordance with some embodiments. The method 200 can be performed by a program, custom circuitry, or by a combination of custom circuitry and a program. For example, the method 200 can be performed by one or more processors configured to execute instructions that cause the processor(s) to carry out the functionality of the user interface 110, the ingestion engine 120, and/or the intelligent design generator 130. Furthermore, persons of ordinary skill in the art will understand that any system that performs method 200 is within the scope and spirit of the embodiments described herein.

At step 202, a textual request is received from a user interface 110.

At step 204, the textual request is parsed based on semantic data models 122 to generate a parsed request. In an embodiment, the textual request is processed by at least one machine learning algorithm 152 and/or at least one neural network 154 in order to generate the parsed request that is fit to one or more of the semantic data models 122.

At step 206, a solution design blueprint is generated based on a design library 124. In an embodiment, the parsed request is processed by at least one additional machine learning algorithm 152 and/or at least one additional neural network 154 in order to generate the solution design blueprint. The machine learning algorithm 152 can consume the design library 124 in order to map components of the parsed request to existing components in the design library 124.

At step 208, the solution design blueprint is presented to a user in the user interface 110. In an embodiment, the solution design blueprint is presented in a graphical user interface active on a display device on a client device such as a laptop computer, desktop computer, tablet computer, or the like.

Figure 2B:
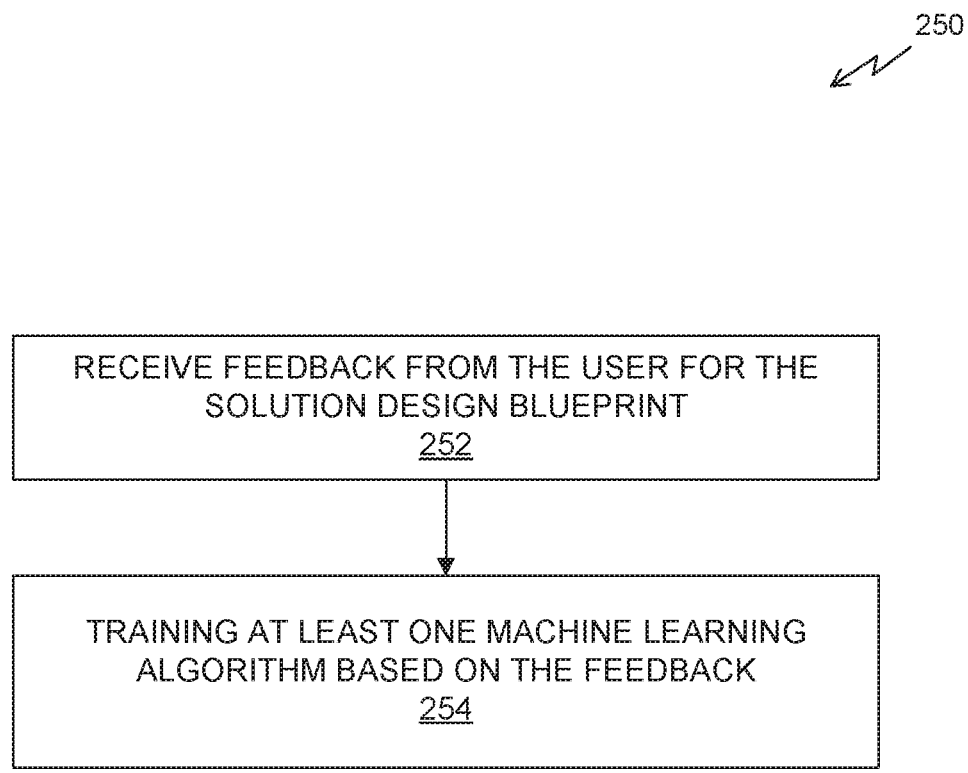
FIG. 2B is a flow diagram of a method 250 for training a machine learning algorithm, in accordance with some embodiments.

FIG. 2B is a flow diagram of a method 250 for training a machine learning algorithm, in accordance with some embodiments. The method 250 can be performed by a program, custom circuitry, or by a combination of custom circuitry and a program. Furthermore, persons of ordinary skill in the art will understand that any system that performs method 250 is within the scope and spirit of the embodiments described herein.

At step 252, feedback for the solution design blueprint is received from a user. In an embodiment, the feedback is provided via the user interface 110. The feedback can include, but is not limited to, an indication of whether the solution design blueprint is accepted or rejected, an indication of changes made to the solution design blueprint, an indication of whether the solution design blueprint was implemented or discarded, or the like.

At step 254, at least one machine learning algorithm 152 is trained based on the feedback. In an embodiment, parameters for one or more machine learning algorithms are adjusted using, e.g., back propagation with gradient descent or other types of training techniques based on the feedback. In some embodiments, the at least one machine learning algorithm 152 includes an adversarial neural network, and the feedback and solution design blueprint are used as a training sample to train the adversarial neural network. The machine learning algorithm(s) 152 implemented by the ingestion engine 120 operate as a generative network such that the system 100 implements, at least in part, a generative adversarial network (GAN) to generate the solution design blueprints.

Figure 3A:
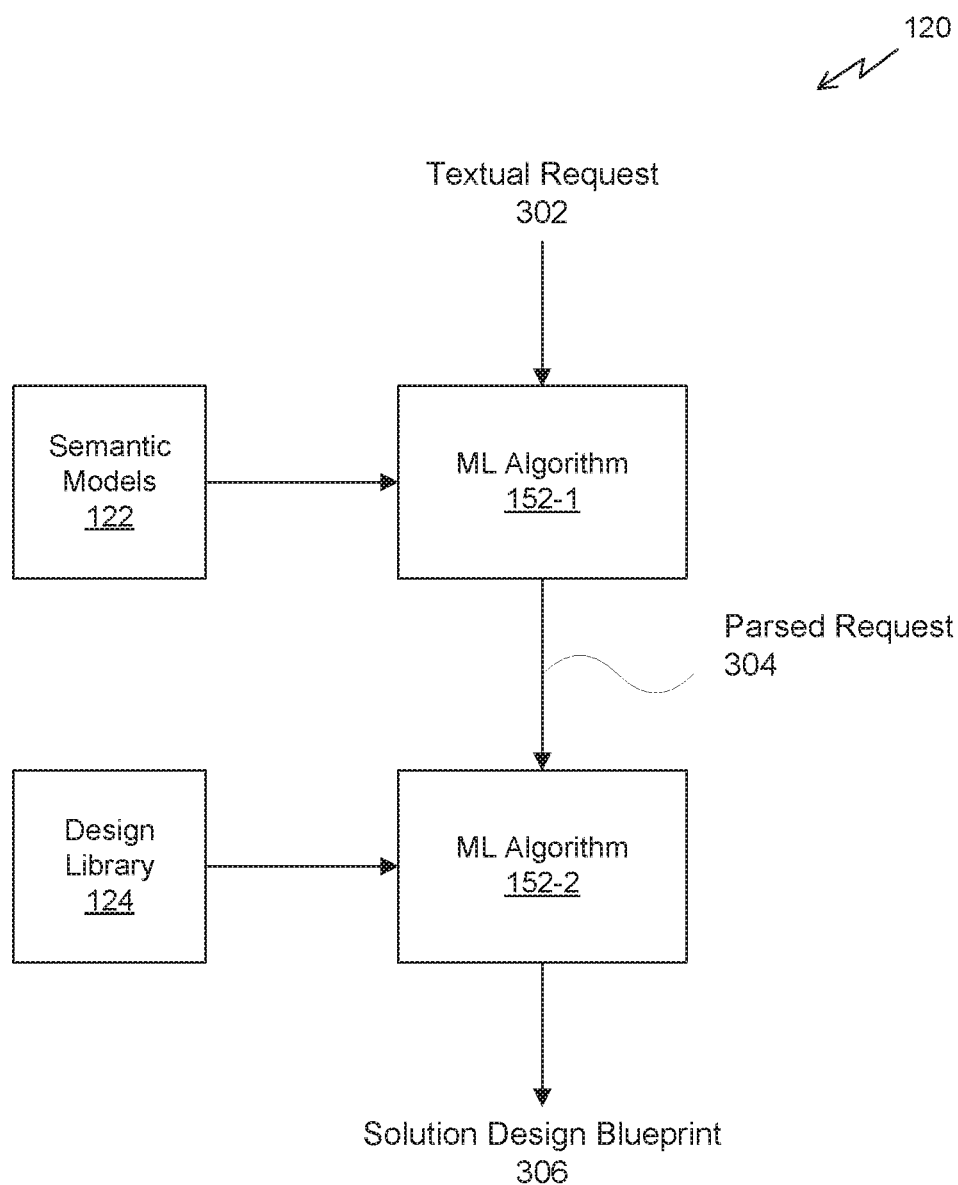
FIG. 3A illustrates the operation of the ingestion engine 120, in accordance with some embodiments.

FIG. 3A illustrates the operation of the ingestion engine 120, in accordance with some embodiments. As depicted in FIG. 3A, a textual request 302 is received from a user interface 110 by the ingestion engine 120. The textual request is processed by a first machine learning algorithm 152-1, which also ingests the semantic data model(s) 122. The first machine learning algorithm 152-1 operates to parse the elements of the textual request to fit the semantic data model(s) 122 in order to generate the parsed request 304. In one embodiment, the first machine learning algorithm 152-1 incorporates a CNN for natural language processing. The CNN can be configured to perform sentiment analysis and topic categorization quickly and with minimal coding. In some embodiments, the CNN can be augmented with additional layers to provide additional functionality, such as semantic mapping, when necessary.

The parsed request 304 is then processed by a second machine learning algorithm 152-2, which also ingests the design library 124. The second machine learning algorithm 152-2 operates to map zero or more elements in the parsed request to corresponding elements included in the design library 124. The transformation of the textual request 302 into a parsed request 304 that fits one or more of the semantic data models 122 where certain elements of the parsed request 304 are then replaced by existing elements included in the design library 124 results in a solution design blueprint 306. In one embodiment, the second machine learning algorithm 152-2 incorporates the output of the first machine learning algorithm 152-1. The second machine learning algorithm 152-2 can be configured to utilize a RNN applied to a plurality of images and textual references included in the design library 124. The RNN models a classification to each element of the design library 124, both at initialization and ongoing as new elements are added to the design library 124 or when feedback dictates changes to the trained classification. In other embodiments, the textual request provided by a user can also be evaluated as a stand-alone module (e.g., without prior processing by the CNN of the first machine learning algorithm 152-1), or the textual request can be evaluated in parallel by both the first machine learning algorithm 152-1 and the second machine learning algorithm 152-2, where the second machine learning algorithm 152-2 is not configured to receive the output of the first machine learning algorithm 152-1 as a portion of the input to the RNN.

Figure 3B:
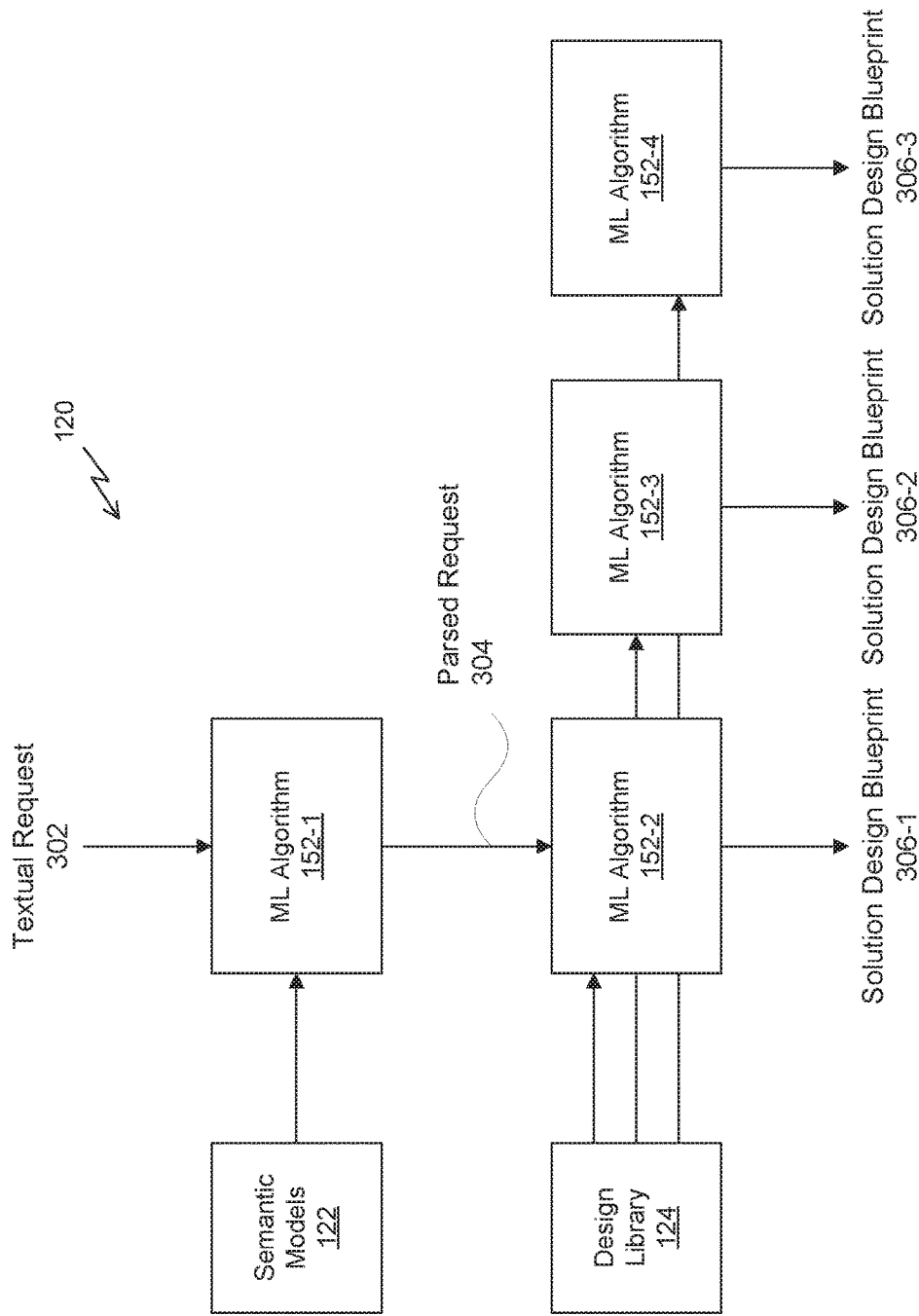
FIG. 3B illustrates the operation of the ingestion engine 120, in accordance with other embodiments.

FIG. 3B illustrates the operation of the ingestion engine 120, in accordance with other embodiments. It will be appreciated that the ingestion engine 120 can be configured to generate one or more candidate solution design blueprints. The structure depicted in FIG. 3A is configured to produce one candidate solution design blueprint. However, given the parsed request 304, there are potentially innumerable options for mapping certain plain English elements to existing elements in the design library 124, especially where the design library 124 includes various alternatives for performing the same or similar functions. For example, the design library 124 may include documentation for three different APIs for three different services that provide network storage. An element in the parsed request 304 that references "a method for storing" may be mapped to a function call of any of the three different APIs for the different network storage services, depending on the parameters of the second machine learning algorithm 152-2. The resulting selection can depend on the structure of the second machine learning algorithm 152-2, as some algorithms may be better at producing results in certain conditions compared to other algorithms. If a solution design blueprint is rejected by a user, then the ingestion engine 120 may need to be re-run using slightly different inputs (e.g., textual request, parsed request, etc.) such as by randomly changing certain terms in the textual request to different terms with similar semantic meaning or by randomly changing a subset of semantic data models 122 or a subset of the design library 124 ingested by the machine learning algorithms 152 in order to produce a different solution design blueprint for the same original textual request. Alternatively, the parameters associated with the machine learning algorithm 152, such as the weights for a particular neural network 154 executed as part of the machine learning algorithm 152, can be adjusted before processing the textual request a second time using the same semantic data models 122 and/or design library 124.

In some embodiments, as an alternative to the described operation of the ingestion engine 120 set forth above, the ingestion engine 120 can be configured to process the parsed request 304 by two or more different machine learning algorithms 152 in parallel paths to generate two or more candidate solution design blueprints 306 at the same, or substantially similar, time. As depicted in FIG. 3B, the ingestion engine 120 can include a second machine learning algorithm 152-2, a third machine learning algorithm 152-3, and a fourth machine learning algorithm 152-4. Each of the three machine learning algorithms 152 ingests the design library 124 and generates a separate and distinct solution design blueprint 306-1, 306-2, and 306-3, respectively. It will be appreciated that the machine learning algorithms 152-2, 152-3, and 152-4 can have the same or different structure. For example, two machine learning algorithms 152 can have the same structure such as the same series of steps incorporating the same neural networks with the same basic architecture. However, even with the same structure, the two machine learning algorithms 152 can produce different solution design blueprints where the machine learning algorithms 152 are trained using different training data such that the parameters (e.g., weights and/or biases) of the neural networks are different. Alternatively, two machine learning algorithms can have different structure where, for example, different types of neural networks are incorporated into the different machine learning algorithms 152. The multiple machine learning algorithms 152 can produce different results for the same input.

Although not shown explicitly, in some embodiments, the textual request 302 can also be processed by multiple instances of different machine learning algorithms 152 to generate multiple different parsed requests that are each processed by one or more additional machine learning algorithms 152 to generate a plurality of candidate solution design blueprints 306.

The plurality of candidate solution design blueprints can then be passed to the intelligent design generator 130 where the candidates are ranked and sorted to select an optimal solution design blueprint to present to a user.

Figure 4A:
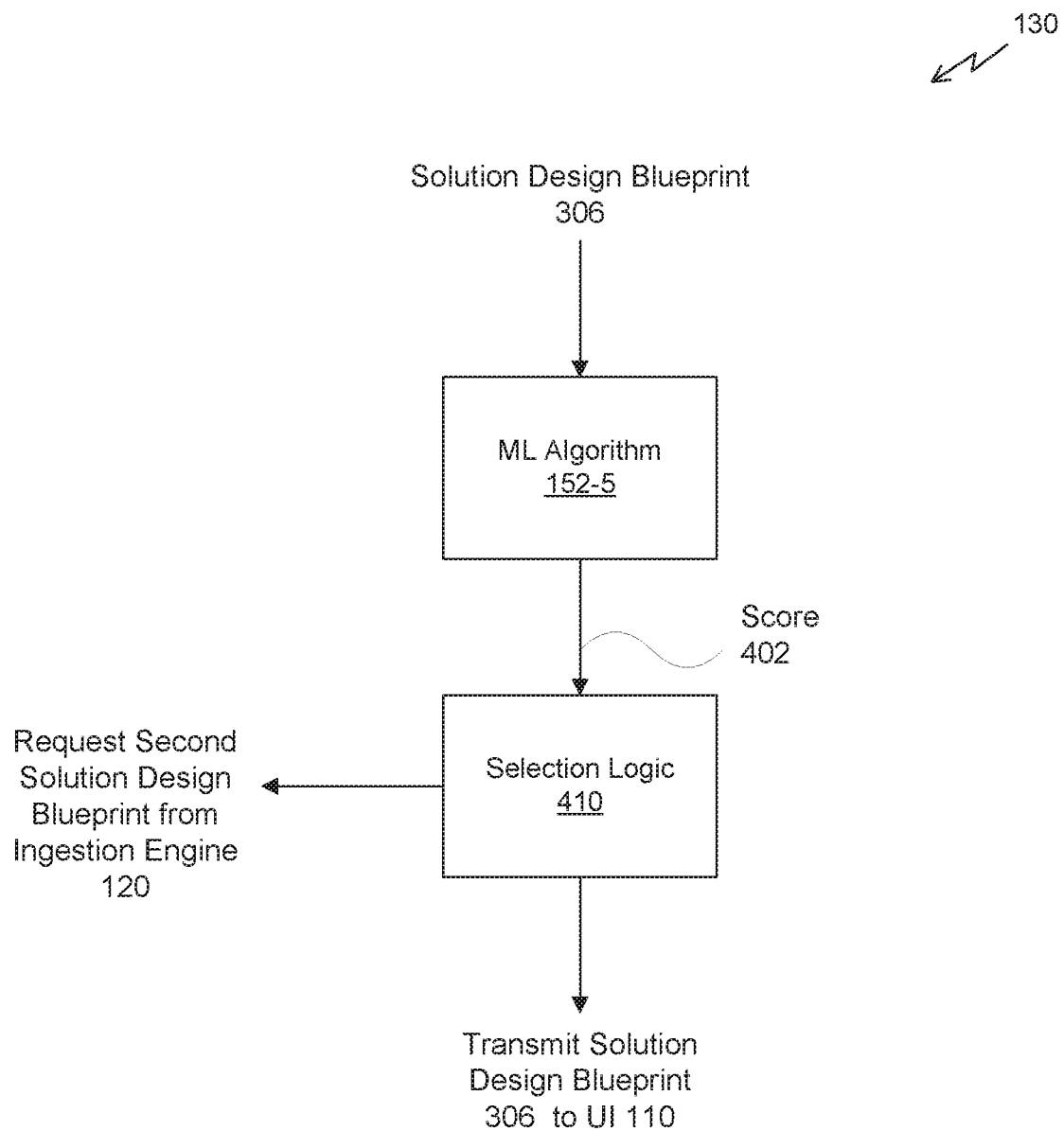
FIG. 4A illustrates the operation of the intelligent design generator 130, in accordance with some embodiments.

FIG. 4A illustrates the operation of the intelligent design generator 130, in accordance with some embodiments. As depicted in FIG. 4A, the intelligent design generator 130 receives a candidate solution design blueprint 306 from the ingestion engine 120. A machine learning algorithm 152-5 processes the solution design blueprint 306 to generate a score 402. Selection logic 410 then determines, based at least in part on the score 402, whether to transmit the candidate solution design blueprint 306 to the UI 110 or to discard the solution design blueprint 306 as unacceptable and request a second, alternative solution design blueprint 306 from the ingestion engine 120.

In some embodiments, the machine learning algorithm 152-5 is a classifier algorithm that classifies the solution design blueprint 306 as either acceptable or not acceptable. For example, the machine learning algorithm 152-5 can be trained to map the solution design blueprint 306 to one of two clusters of similar solution design blueprints identified as acceptable or not acceptable in the past, where an acceptable solution design blueprint is identified as having a score of 1 and a not acceptable solution design blueprint is identified as having a score of 0.

In other embodiments, the machine learning algorithm 152-5 calculates a heuristic value based on different characteristics of the solution design blueprint 306, one or more components of which can be the result of processing the solution design blueprint 306 by a corresponding neural network 154. For example, the heuristic value can be calculated by summing individual scores for different characteristics such as length, number of components, average number of parameters per method, or the like. The heuristic value can then be mapped to a score 402.

In an embodiment, the selection logic 410 is configured to compare the score 402 to a threshold value to determine whether the candidate solution design blueprint 306 is accepted or rejected. In some embodiments, the threshold value is manually configured. In other embodiments, the threshold value can be dynamically configured to match an expected acceptance rate. For example, the threshold value can be automatically adjusted such that 30% of the solution design blueprints 306 are accepted. If a historic trend (e.g., 7-day moving average, 30-day moving average, etc.) differs from the expected acceptance rate, then the threshold value can be adjusted up or down to change the likelihood that a given score is above or below the threshold value.

Figure 4B:
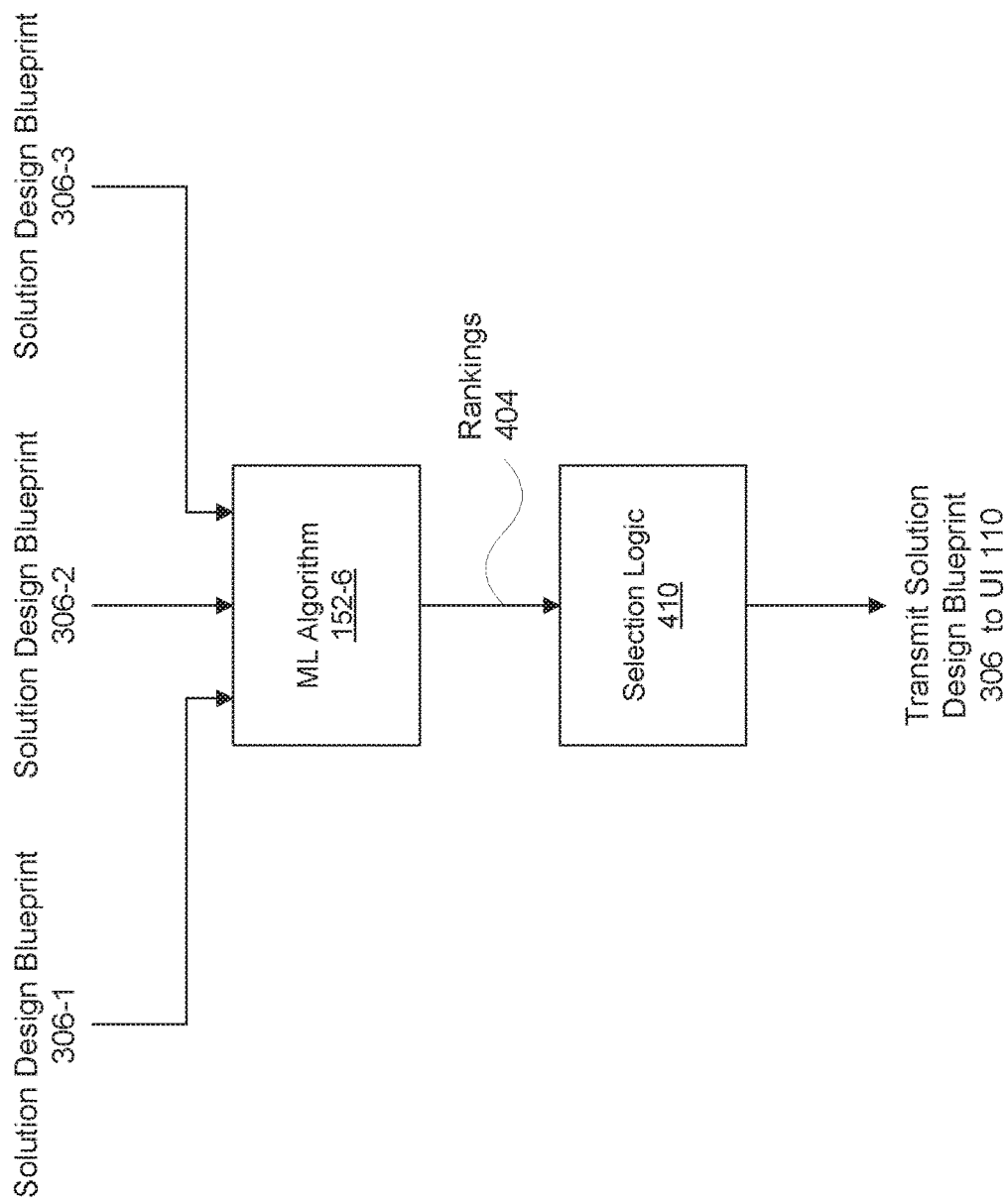
FIG. 4B illustrates the operation of the intelligent design generator 130, in accordance with other embodiments.

FIG. 4B illustrates the operation of the intelligent design generator 130, in accordance with other embodiments. The operation of the intelligent design generator 130 is described in FIG. 4A as processing a single solution design blueprint 306 at a time. Alternatively, the intelligent design generator 130 can be configured to process a plurality of solution design blueprints 306 at once to select a preferred solution design blueprint 306 from the plurality of alternatives as the candidate solution design blueprint 306.

As depicted in FIG. 4B, the machine learning algorithm 152-6 receives three solution design blueprints 306-1, 306-2, 306-3 from the ingestion engine 120. The machine learning algorithm 152-6 processes the three solution design blueprints 306-1, 306-2, 306-3 to generate rankings 404. For example, the machine learning algorithm 404 can be configured to assign a ranking of 1, 2, or 3 to each of the three solution design blueprints 306-1, 306-2, 306-3 that indicates an order of preference of the three alternative solution design blueprints 306-1, 306-2, 306-3. The selection logic 410 is then configured to transmit the solution design blueprint 306 assigned the highest ranking (e.g., a ranking of 1) to the UI 110.

In other embodiments, the machine learning algorithm 152-6 generates rankings as independent heuristic values for each of the plurality of solution design blueprints 306-1, 306-2, 306-3. The selection logic 410 is then configured to compare the plurality of heuristic values to select the solution design blueprint 306 with the best heuristic value (e.g., the highest heuristic value), where the selected solution design blueprint 306 is transmitted to the UI 110.

It will be appreciated that the embodiment of FIG. 4B is configured to operate on three alternative solution design blueprints 306. However, one of skill in the art will recognize that the intelligent design generator 130 can be configured to operate on any number of solution design blueprints 306 (e.g., 2, 4, 5, etc.) generated in parallel by the ingestion engine 120.

Figure 4C:
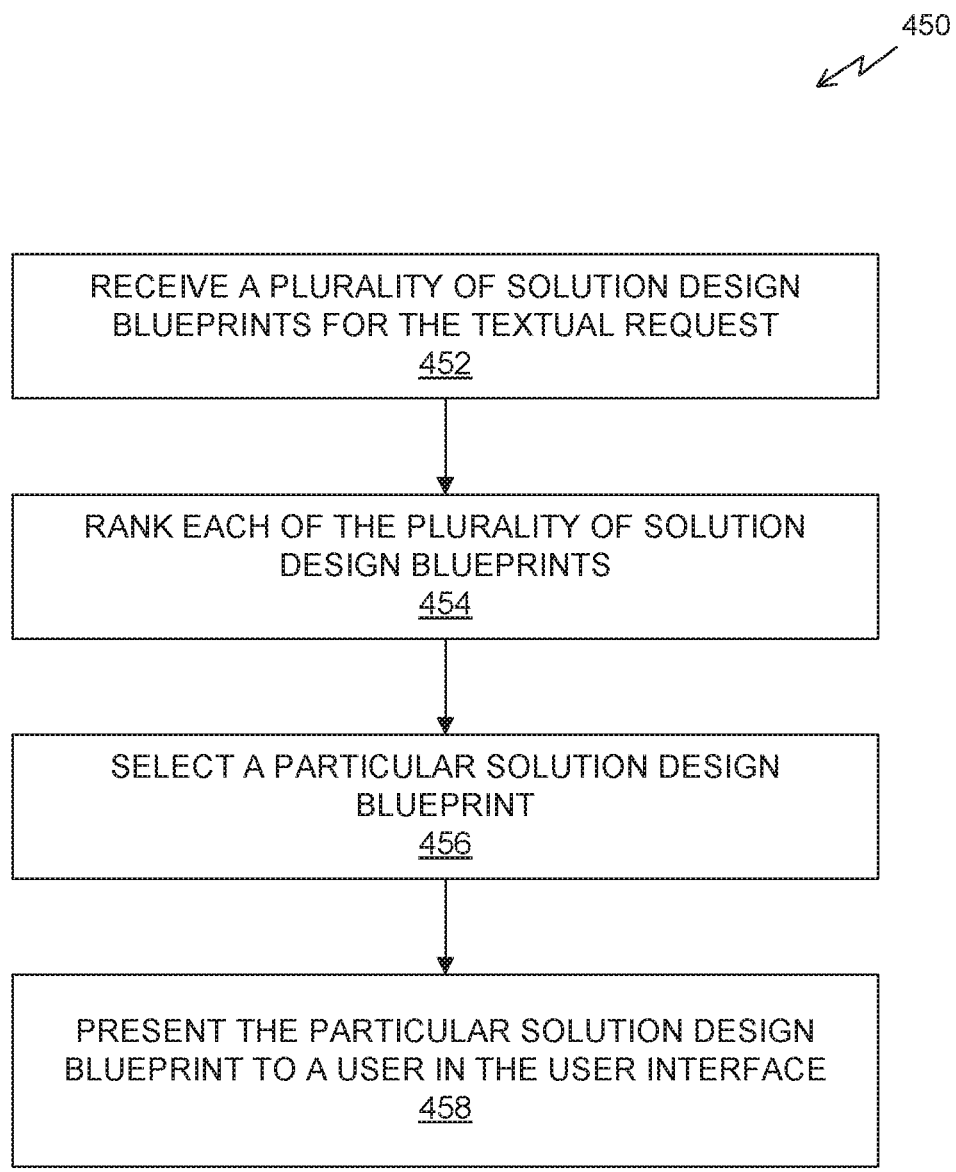
FIG. 4C is a flow diagram of a method 450 for presenting a solution design blueprint 306 to a user, in accordance with some embodiments.

FIG. 4C is a flow diagram of a method 450 for presenting a solution design blueprint 306 to a user, in accordance with some embodiments. The method 450 can be performed by a program, custom circuitry, or by a combination of custom circuitry and a program. Furthermore, persons of ordinary skill in the art will understand that any system that performs method 450 is within the scope and spirit of the embodiments described herein.

At step 452, a plurality of solution design blueprints are received in response to a textual request. The plurality of solution design blueprints 306 can be generated by an ingestion engine 120 based on the textual request. The ingestion engine 120 transmits the plurality of solution design blueprints to the intelligent design generator 130.

At step 454, each of the plurality of solution design blueprints 306 are ranked. In an embodiment, a machine learning algorithm 152-6 is trained to rank the plurality of solution design blueprints 306 based on features extracted from the solution design blueprints 306.

At step 456, a particular solution design blueprint 306 is selected based on the ranks. In an embodiment, selection logic 410 analyzes the ranks generated for each of the plurality of solution design blueprints 306 to select an optimal solution design blueprint 306 to present to a user.

At step 458, the particular solution design blueprint 306 is presented to the user in a user interface 110. A graphical user interface can be configured to display the solution design blueprint 306 on a display device of a computer system. In some embodiments, the user can interact with the solution design blueprint 306 including making edits to the solution design blueprint or providing feedback related to one or more aspects of the solution design blueprint 306.

Figure 5:
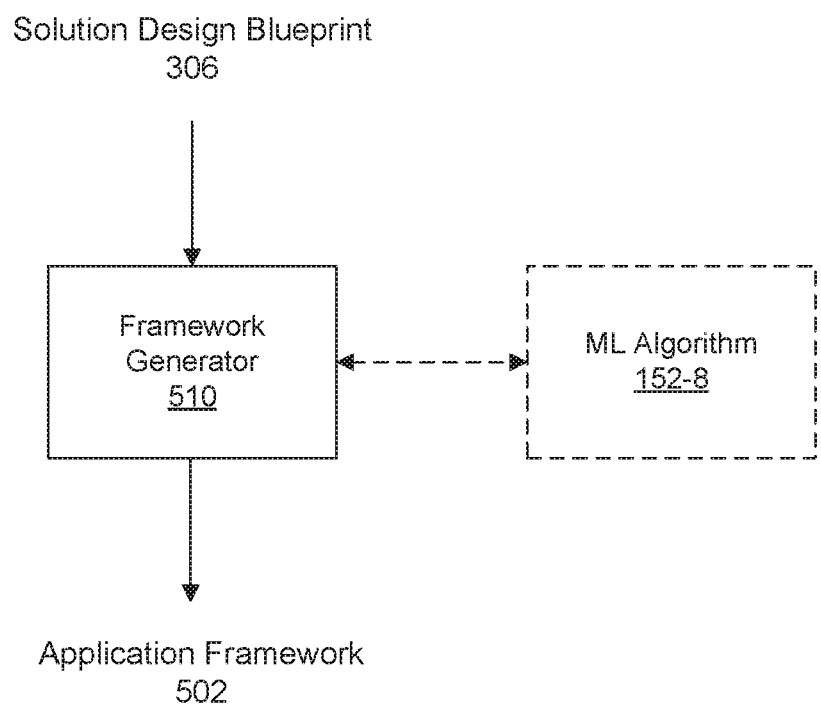
FIG. 5 illustrates operation of the intelligent design generator 130, in accordance with some embodiments.

FIG. 5 illustrates operation of the intelligent design generator 130, in accordance with some embodiments. It will be appreciated that a solution design blueprint 306 is an intermediate, machine-readable description of an application framework. In some embodiments, the intelligent design generator 130 is configured to translate or convert the solution design blueprint 306 into an application framework 502. The application framework 502 can be output for a particular programming environment and include source code in a particular programming language. In some embodiments, while the solution design blueprint 306 is programming language independent, the framework generator 510 is configured to convert the syntax of the solution design blueprint into usable source code that represents an application framework 502 in a particular programming language.

In some embodiments, the framework generator 510 can utilize one or more machine learning algorithms 152-8 that are trained to convert the solution design blueprint 306 into the application framework 502. A different machine learning algorithm 152-8 can be trained for each of a plurality of different programming language such that the resulting application framework 502 can be tailored to a particular programming language desired by the developer. For example, in some cases, an application framework 502 can be generated in a C#programming language and, in other cases, the application framework 502 can be generated in a Python programming language.

It will be appreciated that, in some embodiments, the intelligent design generator 130 is configured to generate an application framework 502 and present the application framework 502 to the user in a user interface 110. In such embodiments, the application framework 502 represents the intermediate solution design blueprint 306, and the user provides feedback related to the solution design blueprint 306 by interacting with, or explicitly providing feedback for, the application framework 502.

Figure 6:
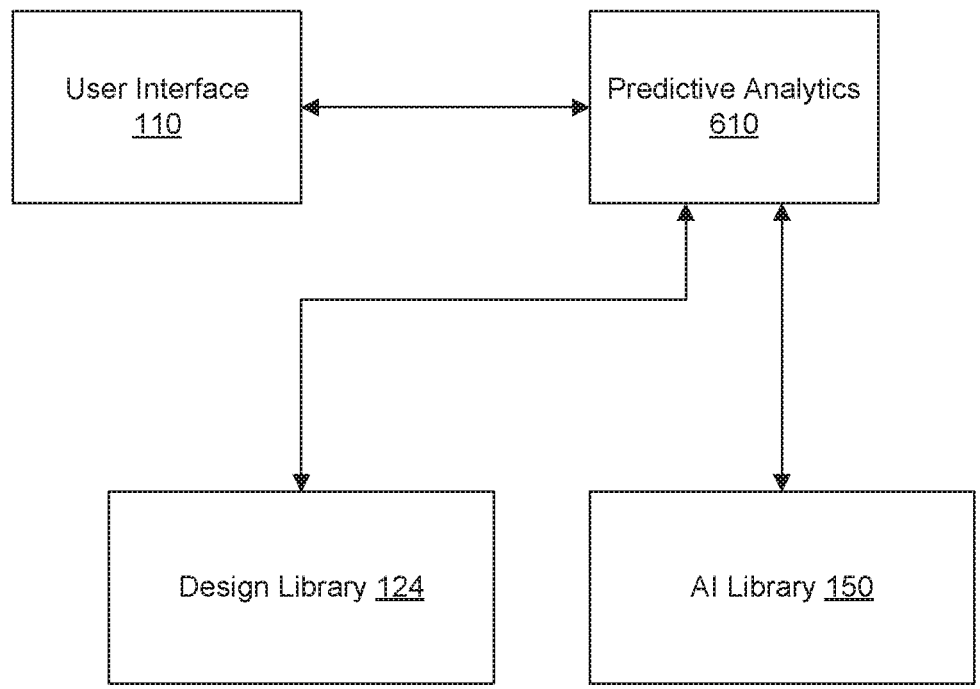
FIG. 6 illustrates enhancements to the user interface 110 using predictive analytics 610, in accordance with some embodiments.

FIG. 6 illustrates enhancements to the user interface 110 using predictive analytics 610, in accordance with some embodiments. As depicted in FIG. 6, a predictive analytics module 610 is coupled to the user interface 110. As the user is typing in a textual request, the predictive analytics module 610 can provide suggested completions within the textual request based on at least one of the design library 124 or the AI library 150. In some embodiments, the predictive analytics module 610 can analyze a portion of a sentence and predict one or more elements defined in the design library 124 that may complete the sentence based on, e.g., past textual requests generated by one or more users. For example, if the sentence begins with "connect module 1 with a database to query for" then the predictive analytics module 610 can suggest various fields that can be queried for one or more databases defined in the design library 124. This can more easily allow a user to attempt to incorporate existing components described in the design library 124 when drafting a textual request using the UI 110.

In some embodiments, the predictive analytics module 610 utilizes components of the AI library 150 in order to generate suggested completions. For example, a portion of a sentence can be processed by a machine learning algorithm 152 in order to generate a suggested completion. In other embodiments, the AI library 150 can be utilized to generate a database that associates certain words with suggested completions that follow those words. The database can be generated ahead of any input received via the UI 110 such that the keywords entered in the textual request can be matched to suggested completions in the database without having to process the text via a machine learning algorithm 152 in real-time.

Figure 7A:
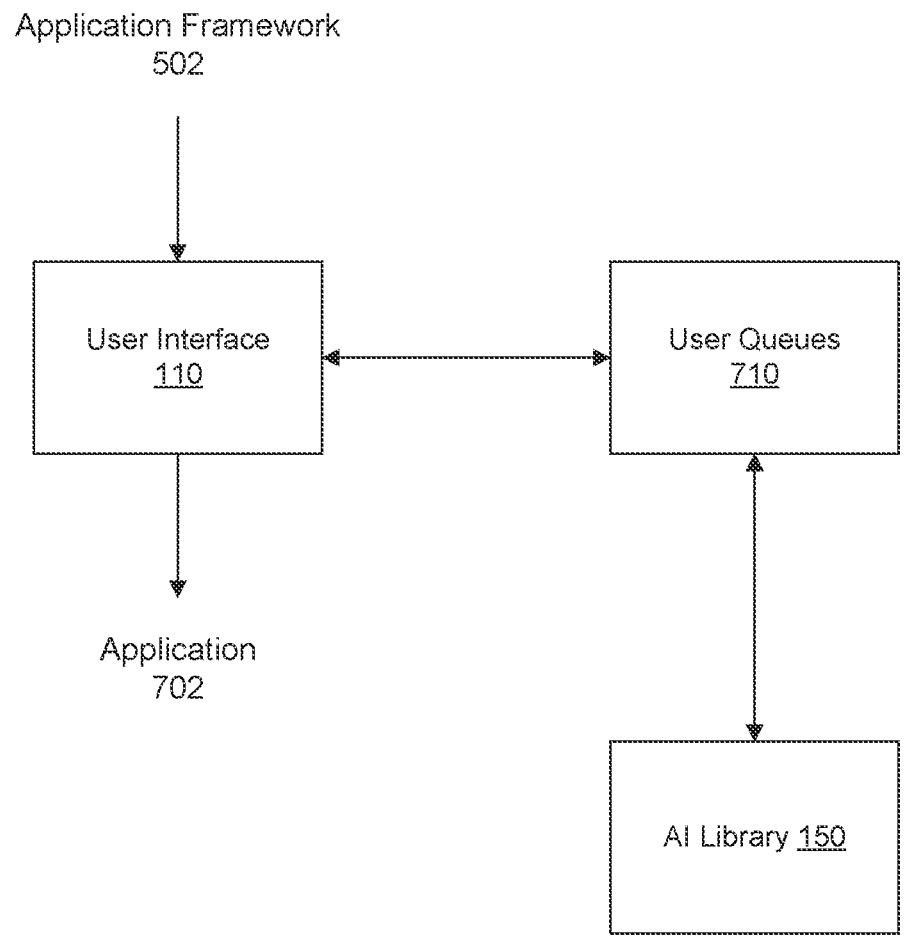
FIG. 7A illustrates a technique for updating the AI library 150 based on user queues 710, in accordance with some embodiments.

FIG. 7A illustrates a technique for updating the AI library 150 based on user queues 710, in accordance with some embodiments. As depicted in FIG. 7A, user queues 710 can be used to track a workflow of a developer that creates an application 702 using the application framework 502. Given that the application framework 502 is merely a suggestion for developing the application 702, at least some components of the application framework 502 may need to be modified by the developer. The user queues 710 are configured to track changes to the source code of the application framework 502 in order to train one or more components of the AI library 150. For example, a machine learning algorithm 152 can be trained based on the feedback tracked by the user queues 710 to help change the output of future solution design blueprints 306 to more closely match the resulting source code used in the application 702.

In some embodiments, logic is configured to analyze the user queues 710 to adjust the parameters of a neural network 154. The modifications in the user queues 710 are related to a loss value that reflects changes in the desired output of the neural network 154. The loss value can be estimated based on the changes in the user queues 710 and used to adjust the parameters of the neural network 154, which is a form of supervised learning.

Figure 7B:
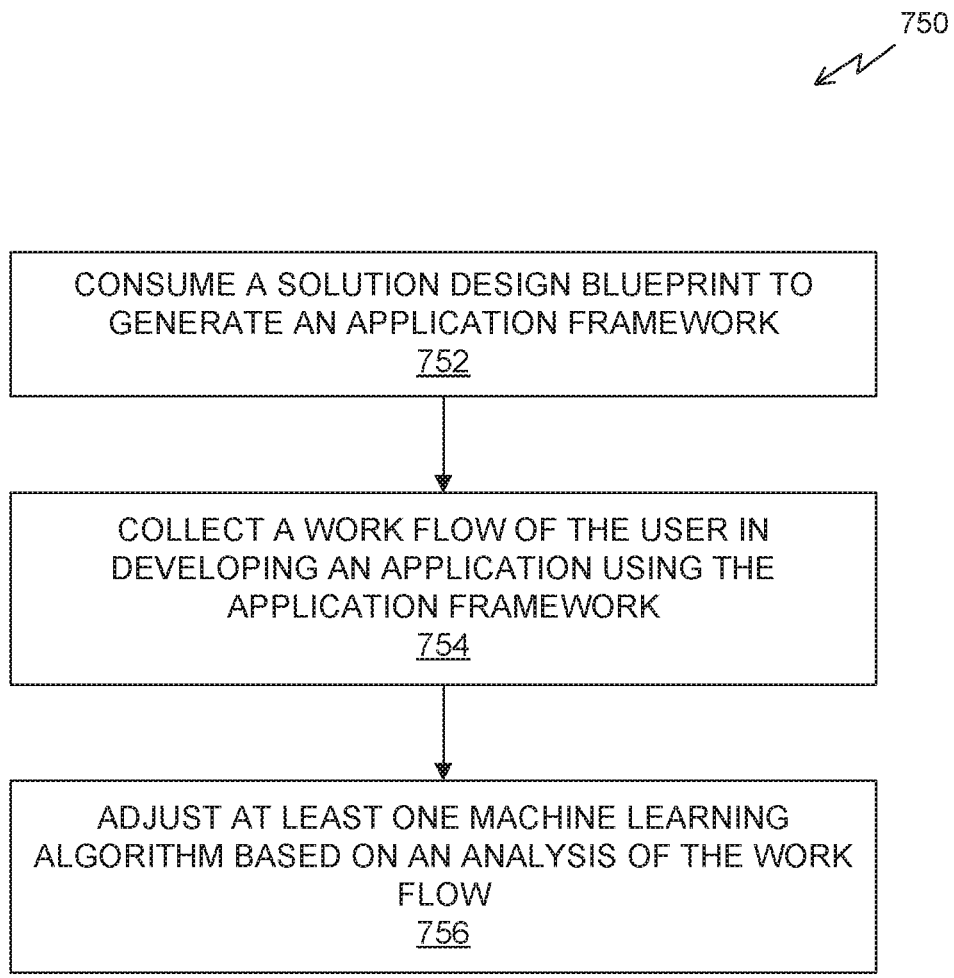
FIG. 7B is a flow diagram of a method 750 for using user queues 710 to adjust the AI library 150, in accordance with some embodiments.

FIG. 7B is a flow diagram of a method 750 for using user queues 710 to adjust the AI library 150, in accordance with some embodiments. The method 750 can be performed by a program, custom circuitry, or by a combination of custom circuitry and a program. Furthermore, persons of ordinary skill in the art will understand that any system that performs method 750 is within the scope and spirit of the embodiments described herein.

At step 752, a solution design blueprint is consumed to generate an application framework 502. In an embodiment, the intelligent design generator 130 generates an application framework 502 and transmits the application framework 502 to the UI 110.

At step 754, a work flow of the user is collected while the user develops an application using the application framework 502. The work flow can be collected in a user queue 710 that pushes entries into a queue related to each operation performed on the application framework 510 within the UI 110. For example, the UI 110 can include an IDE (Integrated Development Environment) that is utilized to generate source code for an application 702. Each modification of the source code included in the application framework 502 can be logged with an entry in a queue.

At step 756, at least one machine learning algorithm is adjusted based on an analysis of the work flow. In an embodiment, logic is configured to analyze the modifications included in the work flow to determine an optimum application framework that is ultimately utilized for development of the application 702. A difference between the optimum application framework and the application framework produced by the intelligent design generator 130 can be utilized to adjust the at least one machine learning algorithm. In some embodiments, the machine learning algorithm can utilize a neural network and the difference is used to modify the parameters of the neural network.

Figure 8:
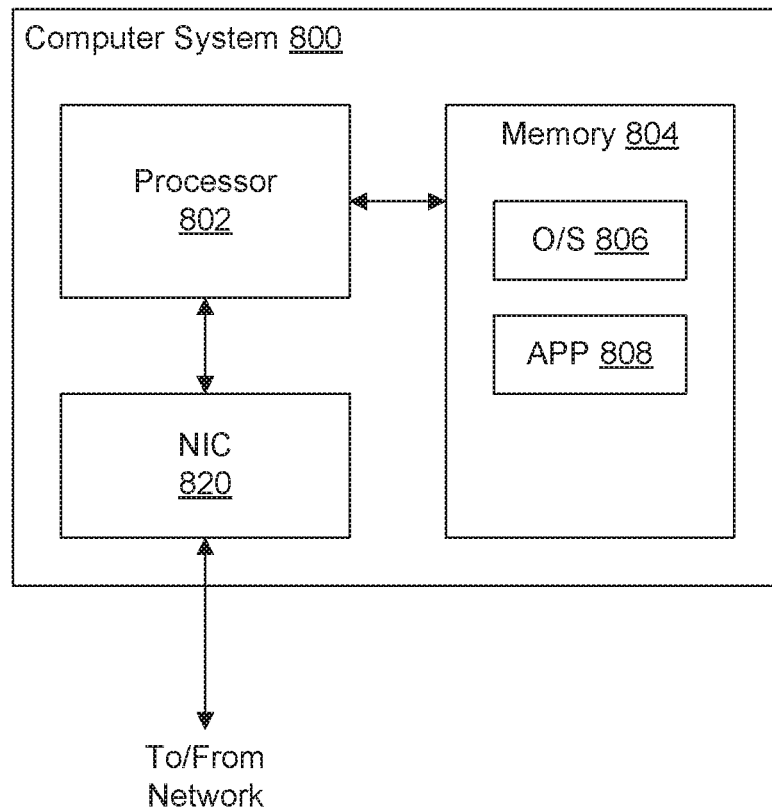
FIG. 8 illustrates an exemplary computer system 800, in accordance with some embodiments.

FIG. 8 illustrates an exemplary computer system 800, in accordance with some embodiments. The computer system 800 includes a processor 802, a non-volatile memory 804, and a network interface controller (NIC) 820. The processor 802 can execute instructions that cause the computer system 800 to implement the functionality various elements of the system 100 described above.

Each of the components 802, 804, and 820 can be interconnected, for example, using a system bus to enable communications between the components. The processor 802 is capable of processing instructions for execution within the system 800. The processor 802 can be a single-threaded processor, a multi-threaded processor, a vector processor or parallel processor that implements a single-instruction, multiple data (SIMD) architecture, or the like. The processor 802 is capable of processing instructions stored in the volatile memory 804. In some embodiments, the volatile memory 804 is a dynamic random access memory (DRAM). The instructions can be loaded into the volatile memory 804 from a non-volatile storage, such as a Hard Disk Drive (HDD) or a solid state drive (not explicitly shown), or received via the network. In an embodiment, the volatile memory 804 can include instructions for an operating system 832 as well as one or more applications. It will be appreciated that the application(s) can be configured to provide the functionality of one or more components of the system 100, as described above. The NIC 820 enables the computer system 800 to communicate with other devices over a network, including a local area network (LAN) or a wide area network (WAN) such as the Internet.

It will be appreciated that the computer system 800 is merely one exemplary computer architecture and that the processing devices implemented in the system 100 can include various modifications such as additional components in lieu of or in addition to the components shown in FIG. 8. For example, in some embodiments, the computer system 800 can be implemented as a system-on-chip (SoC) that includes a primary integrated circuit die containing one or more CPU cores, one or more GPU cores, a memory management unit, analog domain logic and the like coupled to a volatile memory such as one or more SDRAM integrated circuit dies stacked on top of the primary integrated circuit dies and connected via wire bonds, micro ball arrays, and the like in a single package (e.g., chip). In another embodiment, the computer system 800 can be implemented as a server device, which can, in some embodiments, execute a hypervisor and one or more virtual machines that share the hardware resources of the server device.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

What is claimed is:

1. A system for generating solution design blueprints, the system comprising:
    a memory; and
    a processor coupled to the memory and configured to implement:
        a user interface configured to receive a textual request from a user; and
        an ingestion engine in communication with the user interface and configured to:
            process the textual request by two or more machine learning algorithms to generate a solution design blueprint, wherein the solution design blueprint comprises a machine-readable representation of a description for a software framework, and wherein a format of the solution design blueprint is a structured document in an eXtended Markup Language (XML) or a JavaScript Object Notation (JSON) format, wherein at least one machine learning algorithm of the two or more machine learning algorithms is configured to parse the textual request based on semantic data models, and at least one additional machine learning algorithm of the two or more machine learning algorithms is configured to map parsed components of the textual request to components in a design library.

2. The system of claim 1, wherein the design library includes at least one of relational tables and unstructured data.

3. The system of claim 1, wherein the two or more machine learning algorithms includes at least one of a recurrent neural network (RNN), a convolutional neural network (CNN), or a self-organizing feature map (SOFM).

4. The system of claim 1, wherein the processor is further configured to implement:
an intelligent design generator configured to:
reject or accept the solution design blueprint, and
responsive to determining that the solution design blueprint is rejected, select a second solution design blueprint generated by the ingestion engine in response to the textual request, or
responsive to determining that the solution design blueprint is accepted, present the solution design blueprint to the user in the user interface.

5. The system of claim 4, wherein the user interface is configured to receive feedback from the user for the solution design blueprint, and wherein at least one machine learning algorithm is trained based on the feedback.

6. The system of claim 4, wherein the intelligent design generator is further configured to consume the solution design blueprint to generate an application framework.

7. The system of claim 6, wherein the processor is further configured to implement:
at least one user queue that monitors a work flow of the user in generating an application from the application framework, wherein at least one machine learning algorithm is adjusted based on an analysis of the work flow.

8. The system of claim 1, wherein the user interface utilizes predictive analytics to suggest completions for the textual request while the user is typing.

9. A method for generating solution design blueprints, the method comprising:
receiving a textual request from a user interface;
parsing, via at least one machine learning algorithm, the textual request based on semantic data models to generate a parsed request;
generating, via at least one additional machine learning algorithm, a solution design blueprint based on a design library, wherein the solution design blueprint comprises a machine-readable representation of a description for a software framework, and wherein a format of the solution design blueprint is a structured document in an eXtended Markup Language (XML) or a JavaScript Object Notation (JSON) format; and
presenting the solution design blueprint to a user in the user interface.

10. The method of claim 9, wherein the design library includes at least one of relational tables and unstructured data.

11. The method of claim 9, wherein the at least one machine learning algorithm and the at least one additional machine learning algorithm comprise at least one of a recurrent neural network (RNN), a convolutional neural network (CNN), or a self-organizing feature map (SOFM).

12. The method of claim 9, further comprising:
receiving a plurality of solution design blueprints for the textual request;
ranking each of the plurality of solution design blueprints;
selecting a particular solution design blueprint based on the ranking; and
presenting the particular solution design blueprint to the user in the user interface.

13. The method of claim 9, further comprising:
receiving feedback from the user for the solution design blueprint, and
training at least one machine learning algorithm based on the feedback.

14. The method of claim 9, further comprising:
consuming the solution design blueprint to generate an application framework.

15. The method of claim 14 further comprising:
collecting, in a user queue, a work flow of the user in developing an application using the application framework; and
adjusting at least one machine learning algorithm based on an analysis of the work flow.

16. A non-transitory computer-readable medium storing instructions that, when executed by a processor, cause the processor to generate solution design blueprints by performing steps comprising:
receiving a textual request from a user interface;
parsing, via at least one machine learning algorithm, the textual request based on semantic data models to generate a parsed request;
generating, via at least one additional machine learning algorithm, a solution design blueprint based on a design library, wherein the solution design blueprint comprises a machine-readable representation of a description for a software framework, and wherein a format of the solution design blueprint is a structured document in an eXtended Markup Language (XML) or a JavaScript Object Notation (JSON) format; and
presenting the solution design blueprint to a user in the user interface.

17. The non-transitory computer readable medium of claim 16, the steps further comprising:
receiving a plurality of solution design blueprints for the textual request;
ranking each of the plurality of solution design blueprints;
selecting a particular solution design blueprint based on the ranking; and
presenting the particular solution design blueprint to the user in the user interface.

18. The non-transitory computer readable medium of claim 16, the steps further comprising:
consuming the solution design blueprint to generate an application framework;
collecting, in a user queue, a work flow of the user in developing an application using the application framework; and
adjusting at least one machine learning algorithm based on an analysis of the work flow.

* * * * *